(12) United States Patent
Dong et al.

(10) Patent No.: US 7,886,534 B2
(45) Date of Patent: Feb. 15, 2011

(54) INTEGRATED HYDROSTATIC TRANSMISSION ASSEMBLY

(75) Inventors: Xingen Dong, Farmington, CT (US); Barun Acharya, Johnson City, TN (US)

(73) Assignee: Parker-Hannifin Corporation, Cleveland, OH (US)

( * ) Notice: Subject to any disclaimer, the term of this patent is extended or adjusted under 35 U.S.C. 154(b) by 654 days.

(21) Appl. No.: 11/761,697

(22) Filed: Jun. 12, 2007

(65) Prior Publication Data

US 2008/0310972 A1 Dec. 18, 2008

(51) Int. Cl.
*F16D 31/02* (2006.01)
(52) U.S. Cl. .......................................... 60/487
(58) Field of Classification Search .................. 60/468, 60/487, 489
See application file for complete search history.

(56) References Cited

U.S. PATENT DOCUMENTS

| | | | |
|---|---|---|---|
| 3,360,933 A * | 1/1968 | Swanson et al. ............ 60/489 |
| 4,627,237 A | 12/1986 | Hutson | |
| 4,856,368 A * | 8/1989 | Fujisaki et al. ............ 74/606 R |
| 4,870,820 A * | 10/1989 | Nemoto ........................ 60/487 |
| 4,893,524 A * | 1/1990 | Ohashi et al. ................. 60/487 |
| 5,018,351 A | 5/1991 | Otte | |
| 5,119,632 A * | 6/1992 | Nishimura et al. ........... 60/487 |
| 5,142,940 A * | 9/1992 | Hasegawa .................... 60/487 |
| 5,203,169 A | 4/1993 | Ishii et al. | |
| 5,363,740 A | 11/1994 | Coakley | |
| 5,473,964 A | 12/1995 | Okada et al. | |
| 5,540,563 A | 7/1996 | Hansell | |
| 5,979,270 A | 11/1999 | Thoma et al. | |
| RE36,807 E * | 8/2000 | Okada ........................ 60/487 |
| 6,176,086 B1 | 1/2001 | Betz | |
| 6,343,471 B1 | 2/2002 | Thoma et al. | |
| 6,425,244 B1 | 7/2002 | Ohashi et al. | |
| 6,508,059 B1 | 1/2003 | Takada et al. | |
| 6,550,243 B2 | 4/2003 | Hauser et al. | |
| 6,672,843 B1 | 1/2004 | Holder et al. | |
| 6,907,729 B1 * | 6/2005 | Okada et al. ................. 60/487 |
| 6,953,327 B1 | 10/2005 | Hauser et al. | |
| 6,988,580 B2 | 1/2006 | Ohashi et al. | |
| 2003/0070429 A1 | 4/2003 | Jolliff et al. | |

* cited by examiner

*Primary Examiner*—F. Daniel Lopez
(74) *Attorney, Agent, or Firm*—Renner, Otto, Boisselle & Sklar, LLP

(57) ABSTRACT

A hydrostatic transmission mountable to a vehicle frame as a unit. The hydrostatic transmission has a nose cup to which a motor module is mounted. Passageways in an end block connect the pump element and motor module in a closed loop. The end block also has passageways for connecting a charge pump to the closed loop for supplying make-up flow thereto. An isolation plug is provided for separating flow between two intersecting passageways in the end block.

15 Claims, 19 Drawing Sheets

FIG. 16  SECTION G-G

INTEGRATED HYDROSTATIC TRANSMISSION ASSEMBLY

FIELD OF THE INVENTION

The present invention relates generally to hydraulic power units. More particularly, the invention relates to hydrostatic transmissions for use in vehicles, such as mowing machines.

BACKGROUND OF THE INVENTION

Hydrostatic transmissions have many uses, including the propelling of vehicles, such as mowing machines, and offer a stepless control of the machine's speed. A typical hydrostatic transmission system includes a variable displacement main hydraulic pump connected in a closed hydraulic circuit with a fixed displacement hydraulic motor. The closed hydraulic circuit includes a first conduit connecting the main pump outlet with the motor inlet and a second conduit connecting the motor outlet with a pump inlet. Either of these conduits may be the high pressure line depending upon the direction of pump displacement from neutral. For most applications, the pump is driven by a prime mover, such as an internal combustion engine or an electrical motor, at a certain speed in a certain direction. Changing the displacement of the main pump will change its output flow rate, which controls the speed of the motor. Pump outflow can be reversed, thus reversing the direction of the motor. In a vehicle, the motor is typically connected through suitable gearing to the vehicle's wheels or tracks.

In some vehicles, such as zero-turn-radius mowers, separate hydraulic pumps and motors are used to independently drive separate wheels of an axle. By independently driving the wheels in opposite directions, for example, the vehicle can be made to turn with zero radius. Zero-turn-radius mowers are increasingly popular as the size and costs of such mowers decrease. As the size of such mowers decreases, however, the space available for the hydraulic components and/or the prime mover also decreases.

Hydrostatic transmissions generate heat as the hydraulic fluid is circulated between the pump and the motor. Friction between moving parts of the pump and/or motor also generates heat. As hydrostatic transmissions become more compact, heat related issues become more of a problem due to the decreased surface area of the hydrostatic transmission available for dissipating heat.

SUMMARY OF THE INVENTION

The present invention provides a hydrostatic transmission mountable to a vehicle frame as a unit. The hydrostatic transmission has a nose cup to which a motor module is mounted. Passageways in the end block connect the pump element and motor module in a closed loop. The end block also has passageways for connecting a charge pump to the closed loop for supplying make-up flow thereto. An isolation plug is provided for separating flow between two intersecting passageways in the end block.

Accordingly, an integrated hydrostatic transmission comprises an end block having a pump mount surface, a nose cup connected to the end block and having a motor mount surface, a pump element mounted to the pump mount surface of the end block and surrounded by an external pump housing, and a motor module including a motor element mounted to the motor mount surface of the nose cup. The end block and nose cup include supply and return passageways for connecting the pump element to the motor element in a closed loop. The end block has an exposed surface across which air can circulate to dissipate heat generated by the hydrostatic transmission.

In an embodiment, the nose cup includes a tubular portion for receiving and at least partially enclosing the motor element. The nose cup also includes a mounting surface for mounting to a frame of a vehicle. A charge pump is mounted to the end block and connected to the closed loop for supplying makeup flow thereto. The end block also includes a bypass valve for connecting the supply and return passageways of the closed loop. A filter is mounted to the end block and surrounded by the pump housing.

Two intersecting passageways in the end block form a chamber at their intersection, respective portions of the passageways extending from opposite sides of the chamber via openings bounded by a wall of the chamber. A plug with a transversely extending passageway extending therethrough with openings bounded by a side surface of the plug is inserted into the chamber such that the transversely extending passageway is aligned with two of the respective portions of the passageways with the side surface of the plug sealing against the wall of the chamber bounding the openings of the respective portions of the passageway. The plug is spaced apart from the openings of the other two respective portions of the passageways to form a flow passageway through the chamber around the plug.

According to another aspect of the invention, an assembly for use in a hydrostatic transmission comprises a body including two intersecting passageways forming a chamber at their intersection, respective portions of the passageways extending from opposite sides of the chamber via openings bounded by a wall of the chamber. A plug with a transversely extending passageway extending therethrough with openings bounded by a side surface of the plug is inserted into the chamber. The plug is aligned so that the transversely extending passageway is aligned with two of the respective portions of the passageways with the side surface of the plug sealing against the wall of the chamber bounding the openings of the respective portions of the passageways. The plug is spaced apart from the openings of the other two respective portions of the passageways to form a flow passageway through the chamber around the plug.

In an embodiment, a cylindrical bore extends through the chamber, and the plug is generally cylindrical. The bore and the plug have mating threads for securing the plug in the bore. The intersecting passageways intersect at right angles.

According to another aspect of the invention, an assembly for use in a hydrostatic transmission comprises a body including a passageway formed therein. A first plug divides the passageway into a first portion and a second portion. A second plug divides the second portion into an intake line and a discharge line that can be connected by a pump element. The second plug can have a hollow cylindrical shape configured to allow a rotatable shaft, such as an input shaft, to pass therethrough. The first portion of the passageway can be configured to be a motor element drain line connectable to a motor case for draining fluid therefrom.

According to another aspect of the invention, a bypass valve comprises a bypass passage, a valve member configured to respectively block or permit flow through the bypass passage when closed or open, and a bypass cam plug having a surface configured to urge open the valve member. The bypass cam plug acts directly on the valve member.

According to another aspect of the invention, an integrated hydrostatic transmission comprises a pump element, a motor element, supply and return lines connecting the pump element and motor element, and a bypass valve connecting the supply and return lines. The bypass valve is external to a main flow path connecting the pump element and the motor element.

In one embodiment, the bypass valve includes a bypass cam plug configured to urge open a normally closed valve member of the bypass valve when rotated to an open position, and a lever connected to the bypass cam plug for rotating the bypass cam plug. The bypass cam plug extends in a first plane and the lever moveable in a second plane perpendicular to the first plane.

Further features of the invention will become apparent from the following detailed description when considered in conjunction with the drawings.

DETAILED DESCRIPTION

Figure 1:
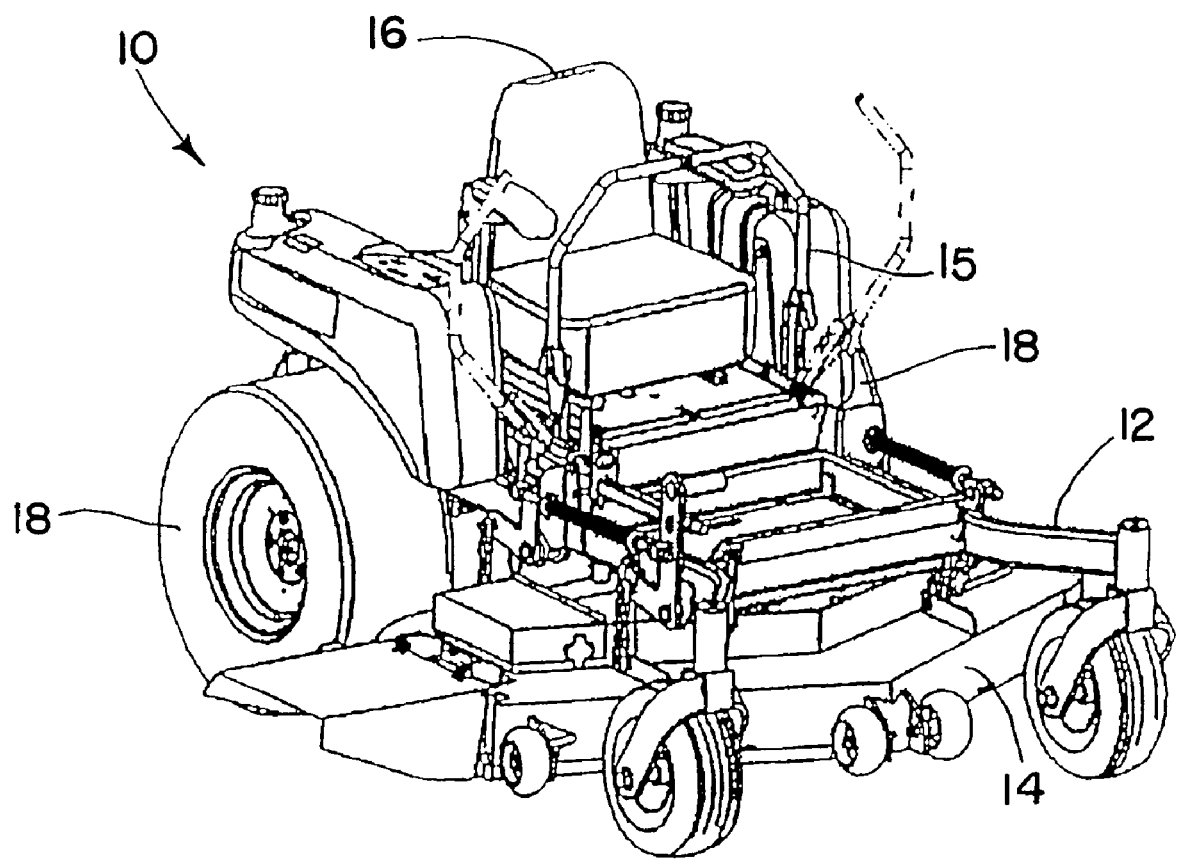
FIG. 1 is an exemplary zero-turn-radius mower employing a hydrostatic transmission including a pulley with an integral fan in accordance with the invention.

Referring now to the drawings in detail, and initially to FIG. 1, an exemplary zero-turn-radius mower 10 is illustrated. The mower 10 includes a frame 12, a mower deck 14 supported by the frame 12 for mowing grass, an operator seat 16, and a plurality of controls 15 for operating the mower 10. A rear mounted engine mounted to the frame 12 behind the seat 16 provides power to first and second hydrostatic transmissions (motor and hydrostatic transmissions not shown in FIG. 1) also mounted to the frame 12. The hydrostatic transmissions can be controlled by an operator to independently drive respective rear wheels 18 to propel the mower and provide zero-turn-radius functionality. The design of the illustrated mower 10 is merely exemplary in nature, and it will be appreciated that other mower designs and vehicle types can be used in accordance with the invention.

Figure 2:
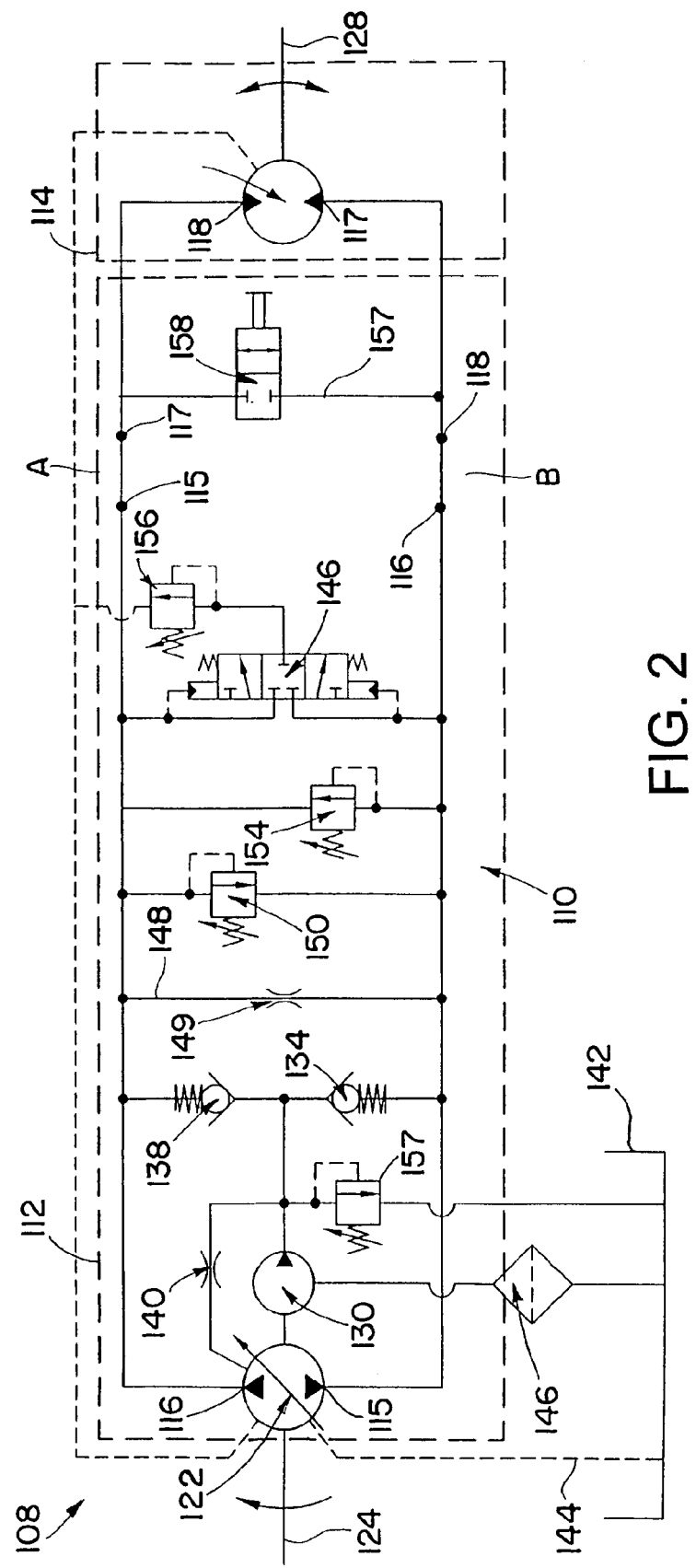
FIG. 2 is an exemplary hydraulic circuit of a hydrostatic transmission.

In FIG. 2, an exemplary hydrostatic transmission is illustrated schematically and is indicated generally by reference numeral 108. The transmission 108 has a pump/motor fluid circuit including a pump assembly 112 and a motor assembly 114. Pump pressure ports 115 and 116 are connected via pressure lines A and B to motor pressure ports 117 and 118, respectively. The pump assembly 112 includes a pump element 122 driven by an input shaft 124 that in turn is driven by a prime mover (not shown), such as an internal combustion engine. The pump assembly 112 can be a variable flow reversible pump, as shown, or any other suitable pump for supplying high pressure hydraulic fluid via line A or B to the motor assembly 114 for driving a motor element 126, such as a gerotor, connected to an output shaft 128. Depending on the operation state of the reversible pump, high pressure fluid will be supplied to either line A or B while the other line serves as a return line. Thus, as used herein, the term high pressure supply line should be understood to refer to either line A or line B, depending on the direction of flow displacement of the pump assembly 112.

In the illustrated embodiment, the pump assembly 112 includes a charge pump 130 driven by the input shaft 124. The charge pump 130 is typically a positive displacement pump having a smaller capacity than pump 122, preferably about 20%-30% of the capacity of pump 122, for the purpose of providing makeup flow of relatively cool hydraulic fluid from a sump 142 to the pressure lines to account for losses due to leakage in the motor and pump and to provide for continuous exchange of fluid between the pump/motor fluid circuit 110 and the sump to prevent overheating of the hydraulic fluid. To this end, the output of the charge pump 130 is connected to supply lines A and B via check valves 134 and 138. The output of the charge pump 130 is also connected via orifice 140 to the pump element 122 to provide relatively cool hydraulic fluid for cooling the pump element 122. The intake of the charge pump 130 is connected to the sump 142 via a filter 146 for drawing fluid therefrom. A sump drain 144 collects fluid leakage, if present, from both the pump assembly 112 and the motor assembly 114 and directs such leakage to the sump 142. As will be appreciated, the sump drain 144 can be formed by the interior of a housing containing the pump assembly 112 and/or motor assembly 114. The sump drain 144 is also connected to a pressure responsive fluid shuttle valve 147 provided for removing some hot fluid from the pressure return line for fluid exchange purposes, with the charge pump 130 providing relatively cooler makeup fluid to the return line. The pressure responsive fluid shuttle valve 147 is sized to supply a sufficient amount of fluid to the sump 142 such that the charge pump 130 is supplied with enough fluid to operate at or near full capacity. The pressure responsive fluid shuttle valve 147 is pressure responsive and is configured to open the return pressure line to the sump drain 144 when high pressure fluid is being supplied to the other line. The fluid removed from the pressure return line is circulated to the sump 142 via sump drain 144 where it is eventually drawn up by the charge pump 30 and then returned to either supply line A or B as described above.

The sump 142 can be provided with cooling fins or other suitable means for dissipating heat from the fluid as desired. In addition, the sump can be oversized to provide a larger reservoir of cooled oil from which the charge pump 130 can draw fluid.

The pump assembly 112 also includes line 148 that connects pressure lines A and B together via orifice 149. Line 148 and orifice 149 function to allow a predetermined amount of cross flow between pressure lines A and B. The cross-flow provided by line 148 and orifice 149 broadens the neutral range of the hydrostatic transmission and provides smoother starting and stopping of the motor assembly 114 when the pump assembly 112 is operated. A pair of high pressure relief valves 150 and 154 is also provided for protecting the hydraulic circuit 110 from overloading during operation. The relief valves 150 and 154 operate to relieve pressure from the high pressure supply line to the pressure return line when an overload condition exists, such as when the pump 122 is being driven by the prime mover but the motor output shaft 28 is prevented from rotating. Pressure relief valves 156 and 157 are also included at the outlet of the shuttle valve 146 and in parallel with the charge pump 130 to ensure that the hydraulic system 10 does not overload. Pressure relief valve 156 further operates to ensure a minimum pressure in the pressure return line to prevent the pump assembly 112 from running dry under low load conditions.

A bypass passageway 157 is connected across the pressure lines A and B to provide a short circuit across the inlet and outlet of the motor assembly 114. The bypass passageway 157 includes a manually controlled bypass valve 158 which, when open, creates a short circuit that permits flow between pressure lines A and B and through the motor element 126 without passage through the pump assembly 112. The bypass valve 158 may be opened to permit free rotation of the motor output shaft 128 as may be desired when the vehicle is being towed or pushed.

Figure 3:
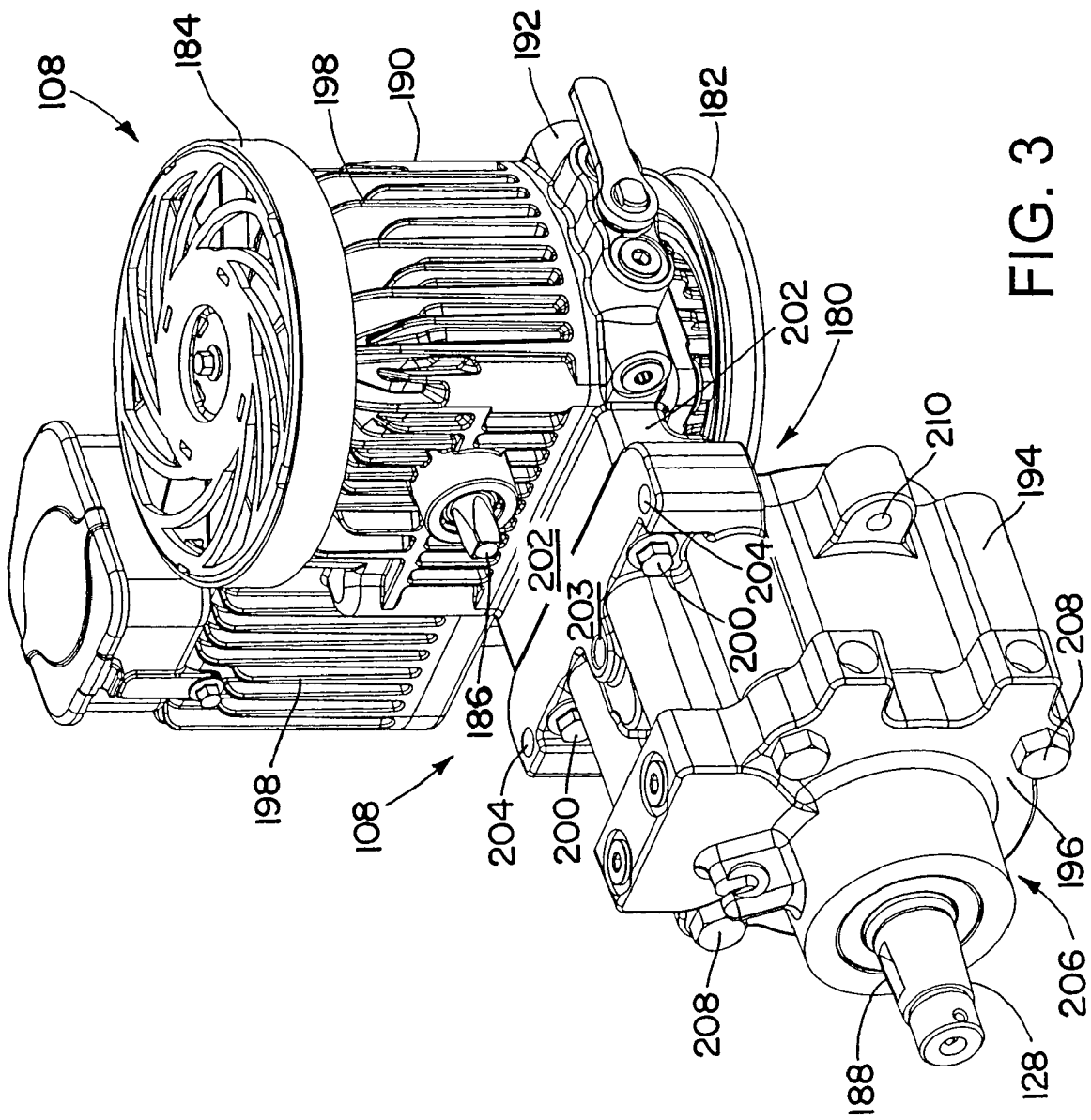
FIG. 3 is a perspective view of a hydrostatic transmission in accordance with the invention.
Figure 4:
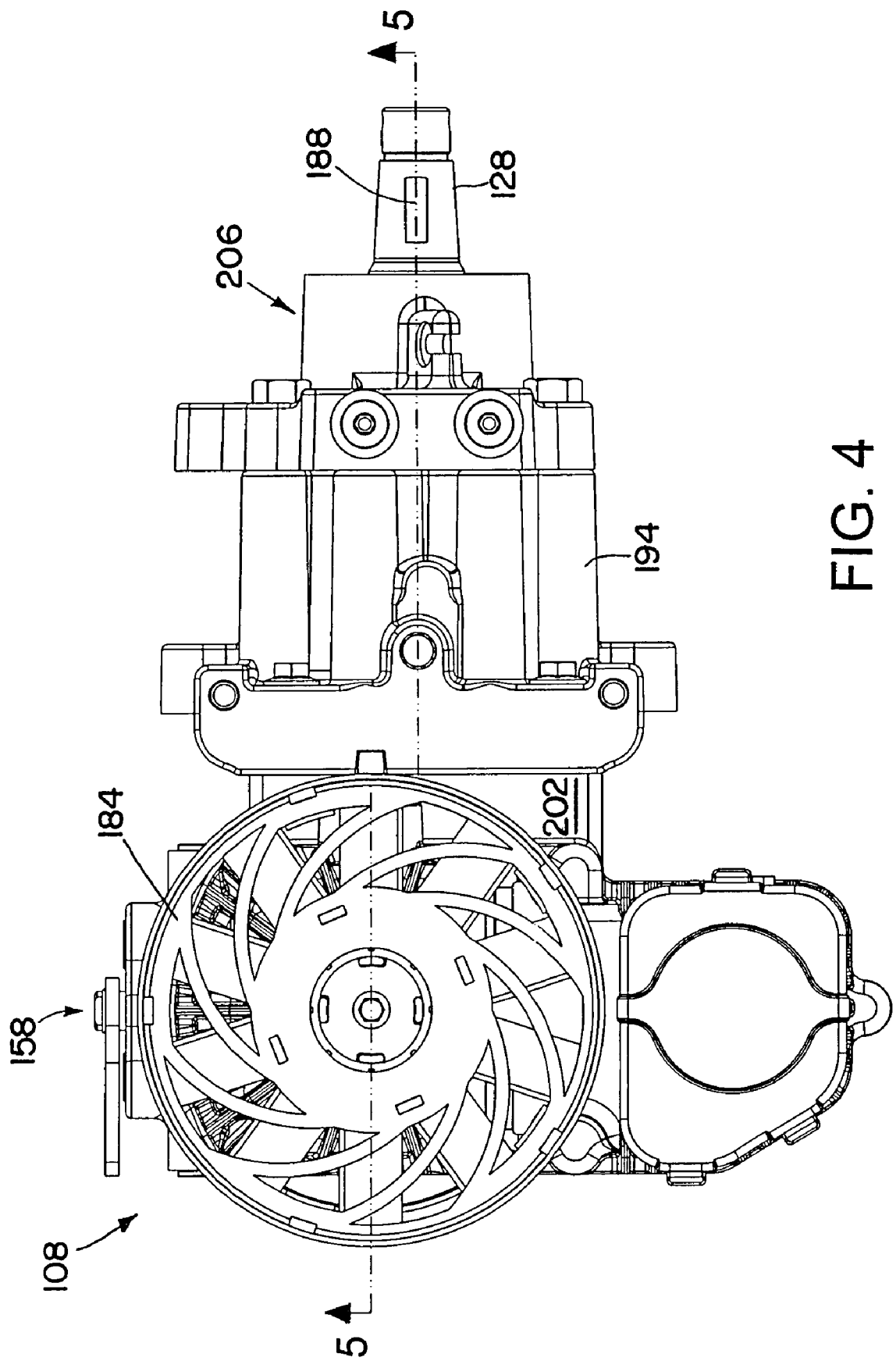
FIG. 4 is a top view of the hydrostatic transmission of FIG. 3.
Figure 5:
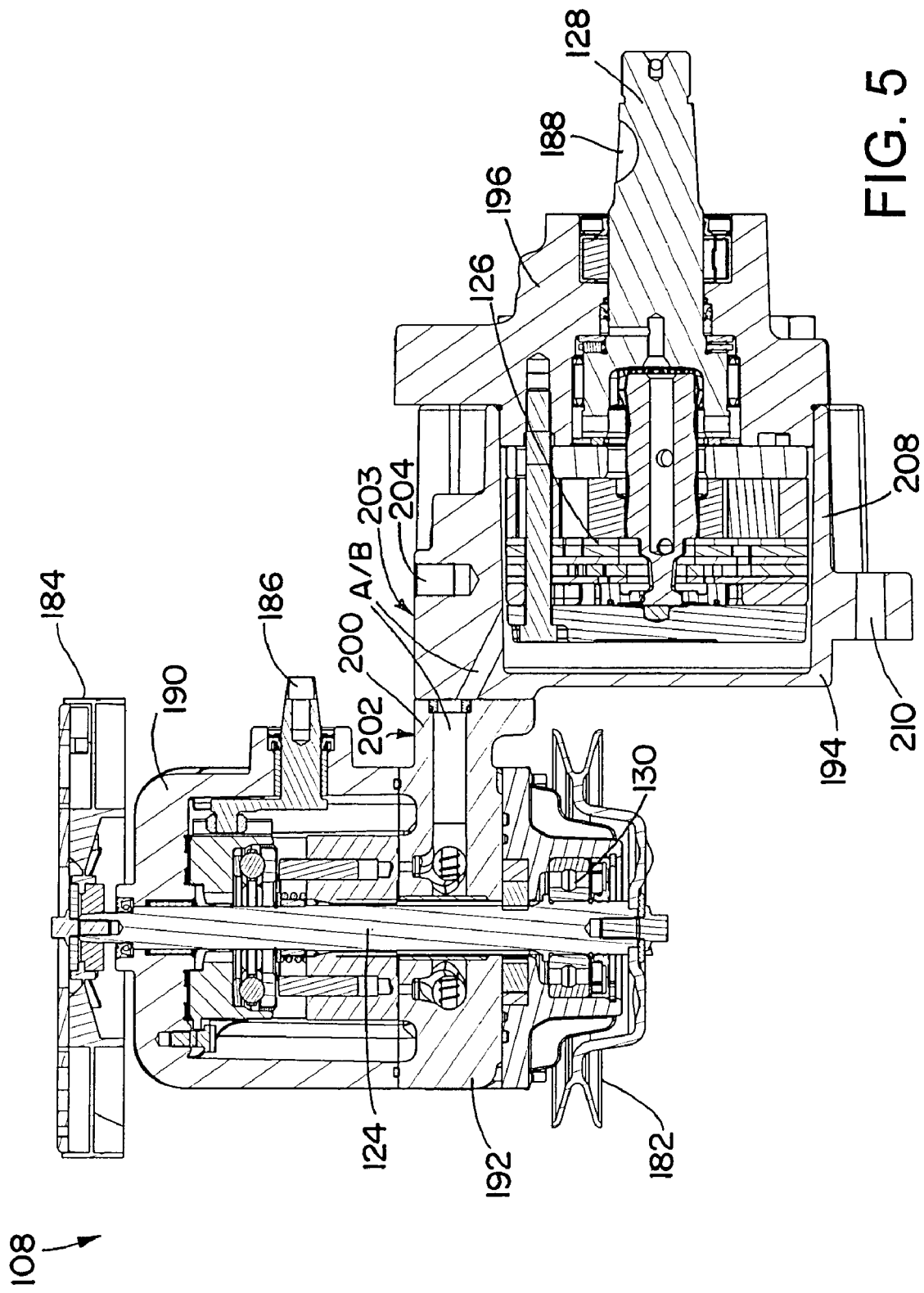
FIG. 5 is a cross-sectional view of the hydrostatic transmission of FIG. 4 taken along the line 5-5.

Turning to FIGS. 3-5, the hydrostatic transmission 108 includes an IHT housing 180 and is mountable to a frame of a vehicle as a unit, as will be described.

The pump input shaft 124 extends from opposing sides of the IHT housing 180. A pulley 182 is provided on the lower end of the shaft 124 for connection via a belt, or other suitable means, to a prime mover such as the internal combustion engine of the mower 10. A fan 184 is secured to the upper end of the pump shaft 124 and is configured to draw air across the hydrostatic transmission 108 for cooling purposes. A trunnion arm 186 extends from housing 180 and is configured to actuate a swash block to control the flow direction and flow rate of the pump element 122 in a conventional manner. The trunnion 186 can be connected to the controls 16 of the mower 10 directly or via a suitable linkage.

The motor output shaft 128 extends from the IHT housing 180 and is supported therein by one or more bearings. The motor output shaft 180 includes a key way 188 for receiving a key for securing a hub of a wheel directly to the output shaft 128 for rotation therewith.

Turning to FIG. 5, some of the internal details of the IHT 108 are illustrated. The IHT housing 180 is generally formed by four components including an external pump housing 190, a pump end block 192, a nose cup 194, and a motor housing 196. The pump element 122 is mounted to the pump end block 192 and surrounded by the external pump housing 190, which is also secured to the end block 192. The external pump housing 190 includes a plurality of cooling fins 198 on its exterior surface for dissipating heat generated by the hydrostatic transmission 108.

In the illustrated embodiment, the pump end block 192 and external pump housing 190 together fully enclose the pump element 122. As will be described, the pump end block 192 has several passageways (e.g., supply and return lines) therein for the supply and return of the fluid between the pump element 122 and the motor element 126, etc. In this regard, the pump end block 192 has an extension 200 through which passageways extend. An external surface 202 of the extension 200 is exposed to the environment for dissipating heat generated during operation of the IHT 108. Further details of the end block 192 are set forth below.

The interior of the external pump housing 190 is typically filled with hydraulic fluid and serves as the sump 142. The oil filter 146 for filtering the fluid of the hydrostatic transmission 108 is mounted to the pump end block 192 and contained within the external pump housing 190. The filter 146, can be accessed from a side of the pump end block 192 thereby allowing easy replacement. The charge pump 130 is mounted to the end block 192 and draws fluid from the sump 142 via the filter 146.

The pump end block 192 and nose cup 194 are connected together with a pair of bolts 200 that extend through bores in the nose cup 194. The nose cup 194 includes passageways (supply line A or return line B shown in FIG. 5) for supplying and returning fluid between the pump element 122 and the motor element 126. The nose cup 194 includes a mounting surface 203 and bolt holes 204 for mounting the IHT 108 to the frame of a vehicle, for example.

The motor element 126 is supported within the motor housing 196. Together, the motor element 126 and motor housing 196 form a motor module 206 that is received within a tubular portion 208 of the nose cup 194 and secured thereto as a unit via bolts 208. The nose cup 194 also has bolt holes 210 associated therewith for further securing the hydrostatic transmission 108 to a vehicle.

It will be appreciated that the motor module 206 is designed to be easily installed as a unit (e.g., mounted to the nose cup 194) to form the IHT 108. Accordingly, motor modules 206 with different characteristics can be installed depending on a given application. For example, various motor modules 206 with motor elements 126 of different displacements can be provided, and a motor module 206 having a motor element 126 with desired displacement can then be selected and installed in the IHT 108. This allows flexibility in manufacturing by allowing an end user to select a motor module 206 having a desired displacement. Thus, a single IHT 108 can be configured to operate in a variety of vehicles and/or applications simply by installing a desired motor module 206. Further, should a motor element 126 require servicing or replacement, the motor module 206 can simply be removed from the IHT 108 to be repaired or replaced.

Figure 6:
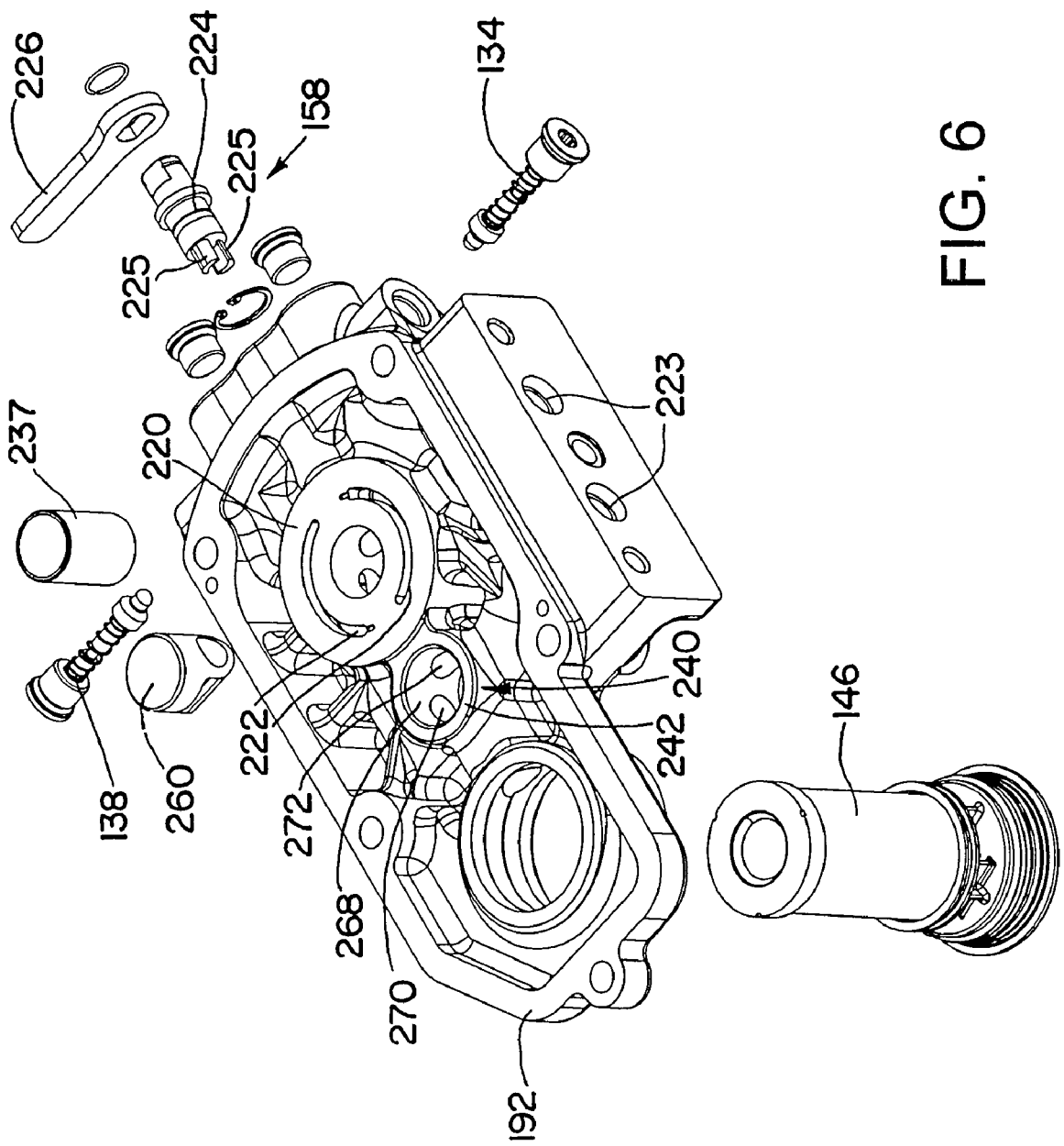
FIG. 6 is an assembly diagram of an end block of the transmission.
Figure 7:
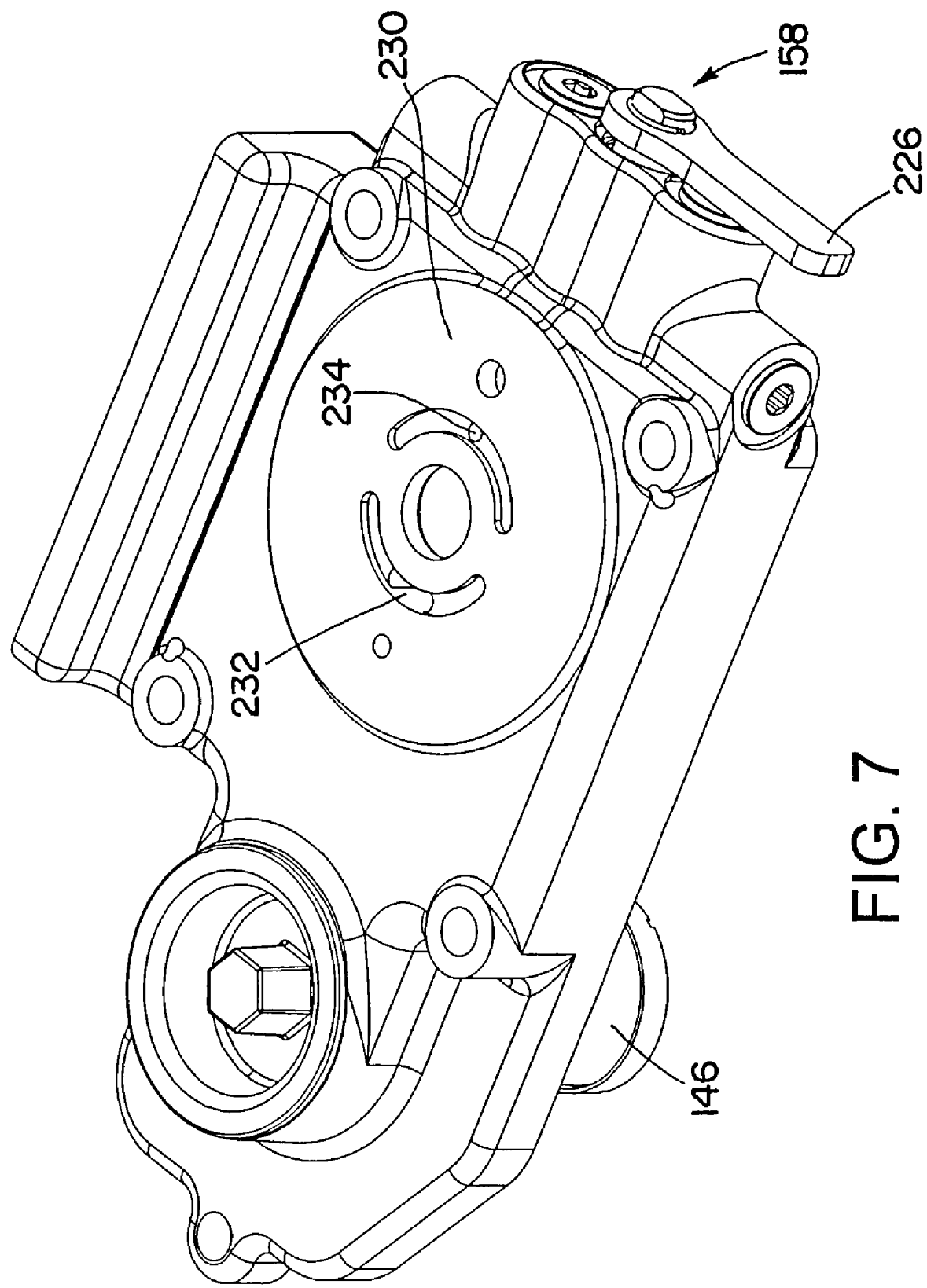
FIG. 7 is a perspective view of the underside of the end block.

Turning now to FIGS. 6-13, and initially to FIGS. 6 and 7, the details of the end block 192 will be described. The end block 192 has a pump mount surface 220 having kidney ports 222 for supplying and returning fluid from the pump element 122. The kidney ports 222 connect via internal passageways (e.g., supply and return lines A and B) to supply and return ports 223 located on extension 200. Supply and return ports 223 connect to corresponding ports and passageways in the nose cup 194, which in turn communicate with the motor element 126 thereby forming a closed hydraulic loop including the pump element 122 and the motor element 126.

Check valves 134 and 138 are provided in the end block 192 between the charge pump 130 and supply and return lines A and B. The check valves 134 and 138 function as pressure relief valves to prevent pressure in lines A and/or B from exceeding a prescribed level. The check valves 134 and 138 are also part of bypass valve 158 that includes a bypass cam plug 224 having cam surfaces 225 configured to urge check valves 134 and 138 open when rotated 90 degrees. A bypass lever 226 is connected to the cam plug 224 for manually rotating the cam plug 224 to open and/or close the bypass valve 158.

The position of the bypass valve 158, which is generally outside of the major flow path between the motor and the pump, reduces or minimizes pressure loss or flow restriction in the hydraulic circuit between the pump and motor. As will be appreciated, the major flow path includes the portions of supply and return lines A and B between the pump element and the motor element through which fluid flows during normal operation of the hydrostatic transmission. Unless one or both of the check valves 134 and 138 are open, no fluid is generally flowing in either of supply and return lines A and B in the region of the bypass valve 158. When both check valves 134 and 138 are open, supply and return lines A and B are connected and the pump element 122 is bypassed.

In FIG. 7, the underside of the end block 192 is illustrated. The end block 192 includes a charge pump mount surface 230 to which the charge pump 130 mounts. Fluid is drawn by the charge pump 130 from the sump 142 via the filter 146 and charge pump intake line 233 through charge pump intake port 232. The charge pump 130 discharges via charge pump discharge port 234 to charge pump discharge line 236. Charge pump intake line 233 and charge pump discharge line 236 are formed by a common passageway P (see FIG. 13) that is separated by plug 237 (see FIG. 6). Plug 237 is cylindrical and hollow such that a rotatable shaft (e.g., the input shaft 124) can extend therethrough for driving the charge pump 130. Charge line 236 is connected to supply and return lines A and B via check valves 134 and 138 for supplying makeup flow thereto.

In FIG. 6, it should be apparent that the charge pump intake line 233 intersects with one of the supply or return lines A and B. The intersection of the charge pump intake line 233 and the supply/return line A or B forms a chamber, generally indicated by reference numeral 240. The chamber 240 is visible in a bore 242 in the end block 192 in FIG. 6. As will now be described, an isolation plug 260 is configured to be inserted into the bore 242 to separate flow between the charge pump intake line 233 and the supply/return line A or B.

Figure 9:
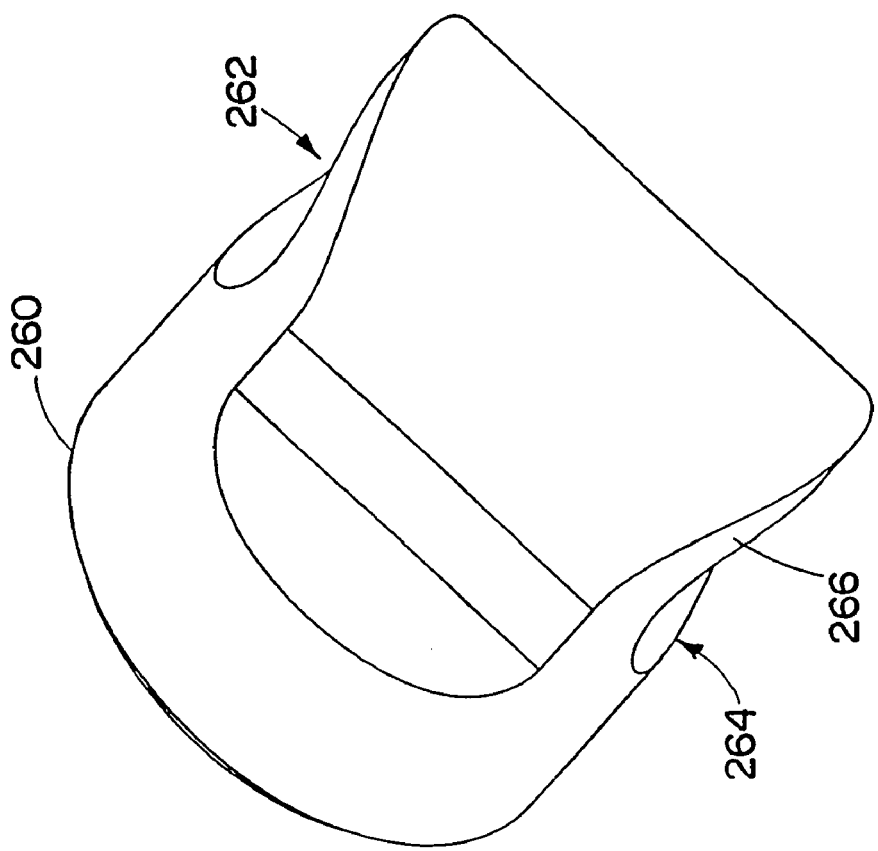
FIG. 9 is another perspective view of the isolation plug.
Figure 8:
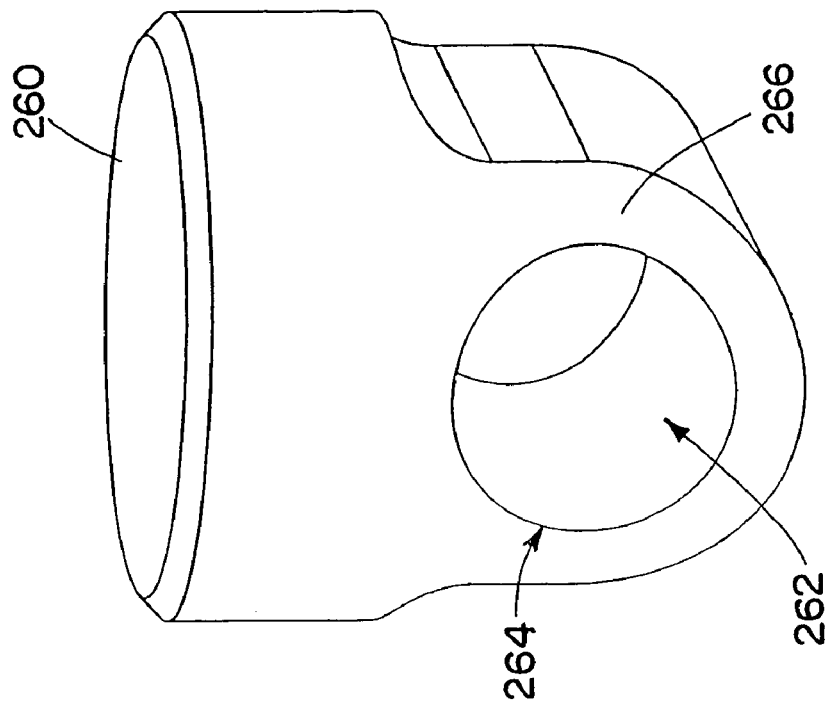
FIG. 8 is perspective view of an isolation plug in accordance with the invention.
Figure 10:
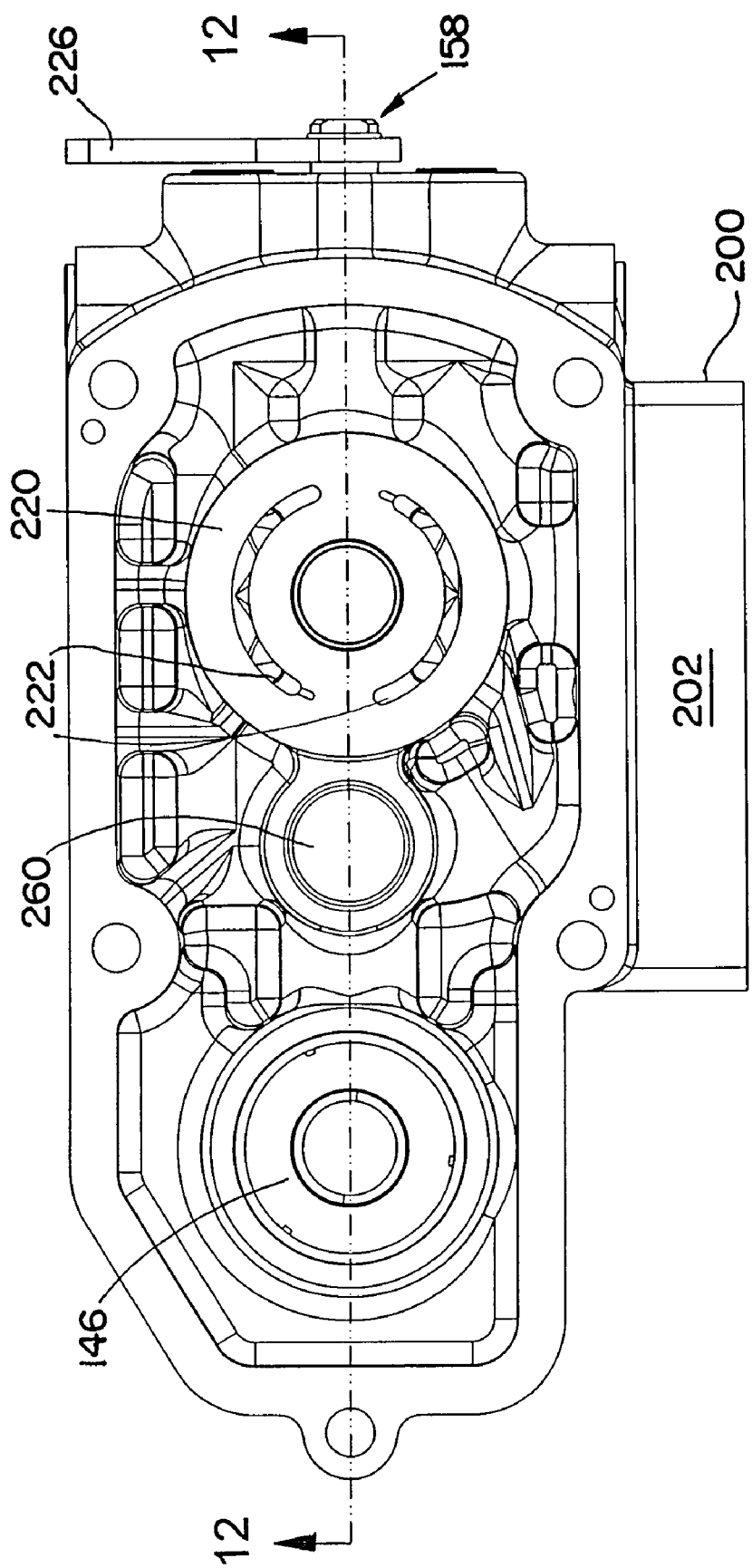
FIG. 10 is a plan view of the end block.
Figure 11:
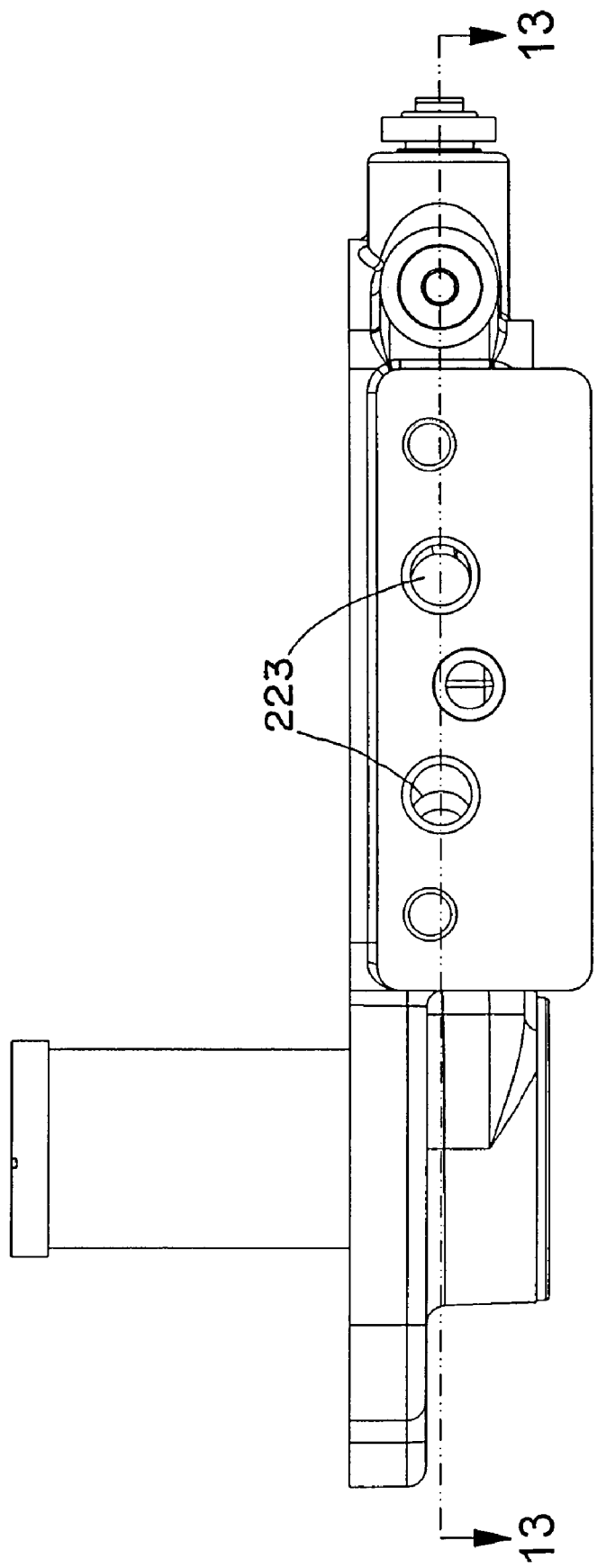
FIG. 11 is a side elevational view of the end block.
Figure 12:
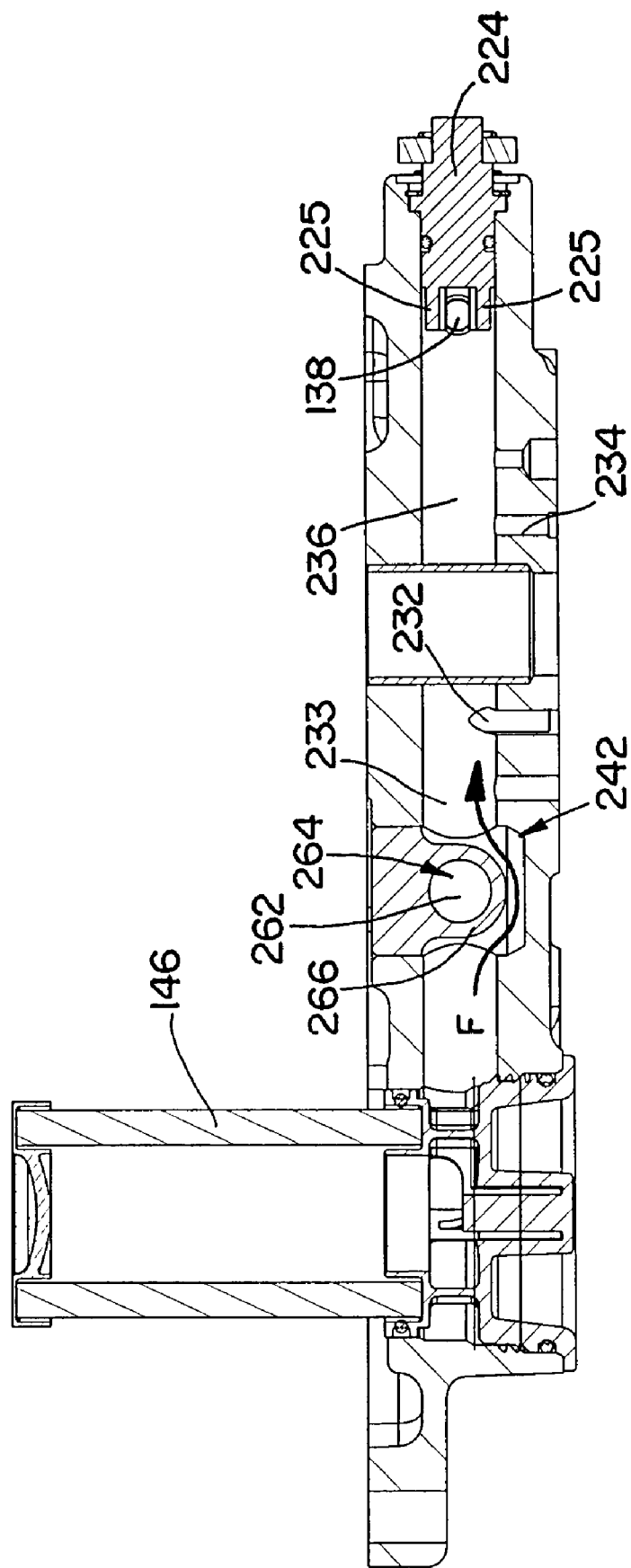
FIG. 12 is a cross-sectional view of the end block taken along the line 12-12 in FIG. 10.
Figure 13:
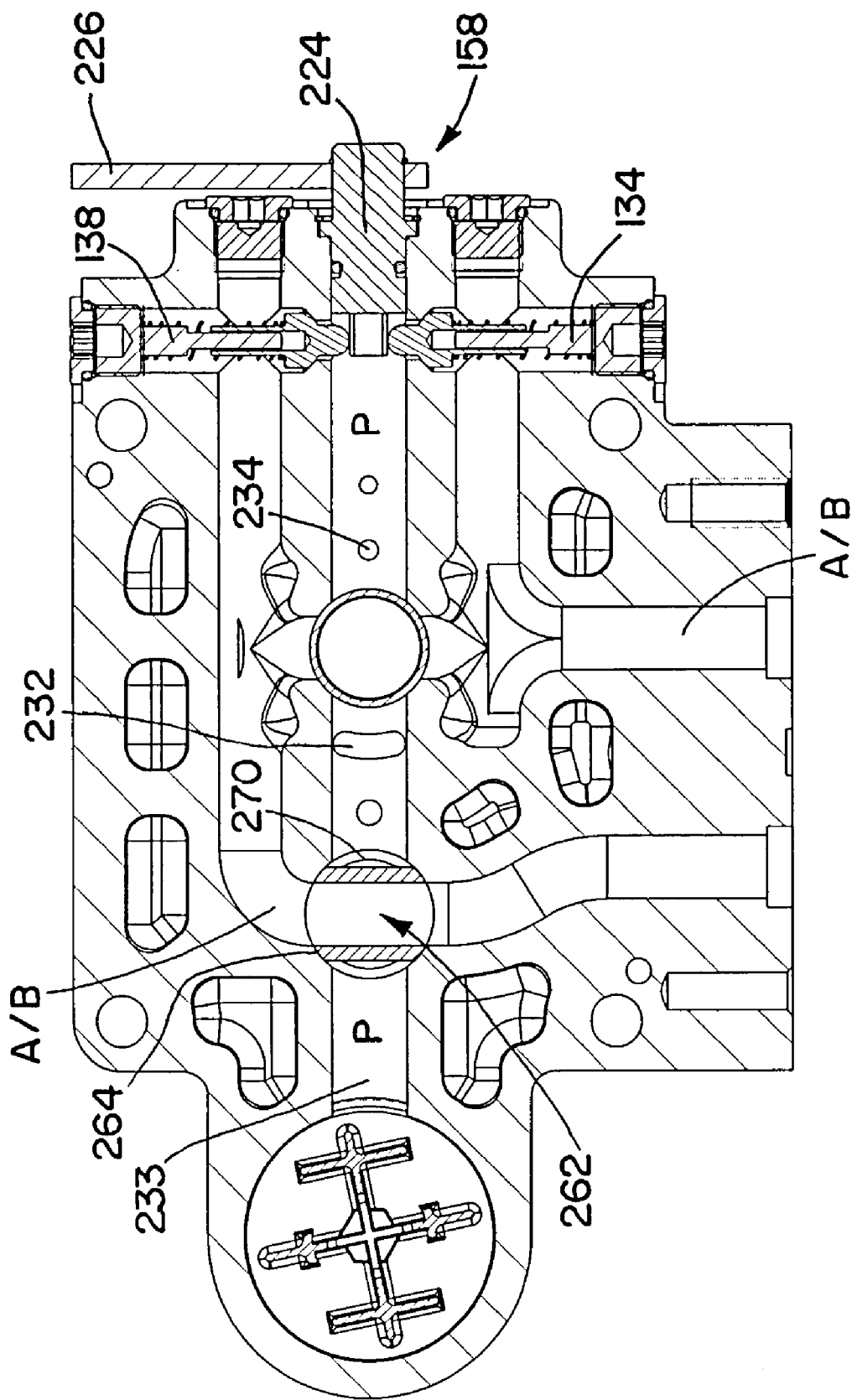
FIG. 13 is a cross-sectional view of the end block taken along the line 13-13 in FIG. 11.

Turning to FIGS. 8 and 9, the plug 260 is illustrated in detail. The plug 260 has a transversely extending passageway 262 that opens on each side to openings 264 bounded by a side surface 266 of the plug 260. The passageway 262 is configured such that when the plug 260 is inserted into the bore 242, the openings 264 of the transversely extending passageway 262 are aligned with two respective portions of either the charge pump intake line 233 or the supply/return line A or B. As will be described below, the side surface 266 of the plug 260 seals against a wall 268 of the chamber 240 that bounds openings 270 of the respective portions of the line. The plug 260 is tapered such that its side surface 266 is spaced apart from openings 272 of the other two respective portions of the other line, thus forming flow passageway through the chamber 240 around the plug 260.

Turning to FIGS. 10-13, the plug 260 is inserted in bore 242. The passageway 262 is aligned with the supply/return line A or B such that the side surface 266 bounding the openings 264 of the passageway 262 seal against the wall 268 of the chamber 240 bounding the openings 270 of respective portions of the line A or B. The side surface 266 of the plug 260 is spaced apart from the openings 272 of the charge pump intake line 233 thereby forming flow passageway F through the bore 242 around the plug 260.

It will be appreciated that in the illustrated embodiment, the bore 242 extends slightly below the flow passageways 233 and A or B to thereby allow fluid to flow under the plug 260. The bore 242, however, need not extend below the passageways. For example, if the intersecting passageways are of different diameters, the plug 260 can be inserted into the chamber 260 such that the plug passageway 262 is aligned with the smaller diameter passageway. Thus, the flow passageway F could extend below the plug 260 within the chamber 260.

In applications where crossover passageways are unavoidable the end block 192 as described above allows the thickness of the end block 192, and thus the overall size of the hydrostatic transmission 108, to be minimized. For example, in the past, crossover passageways in a body would be routed above/below one another (e.g., stacked) thus requiring a thicker body. In contrast, the end block 192 need only be thick enough to accommodate a single layer of passageways.

Figure 14:
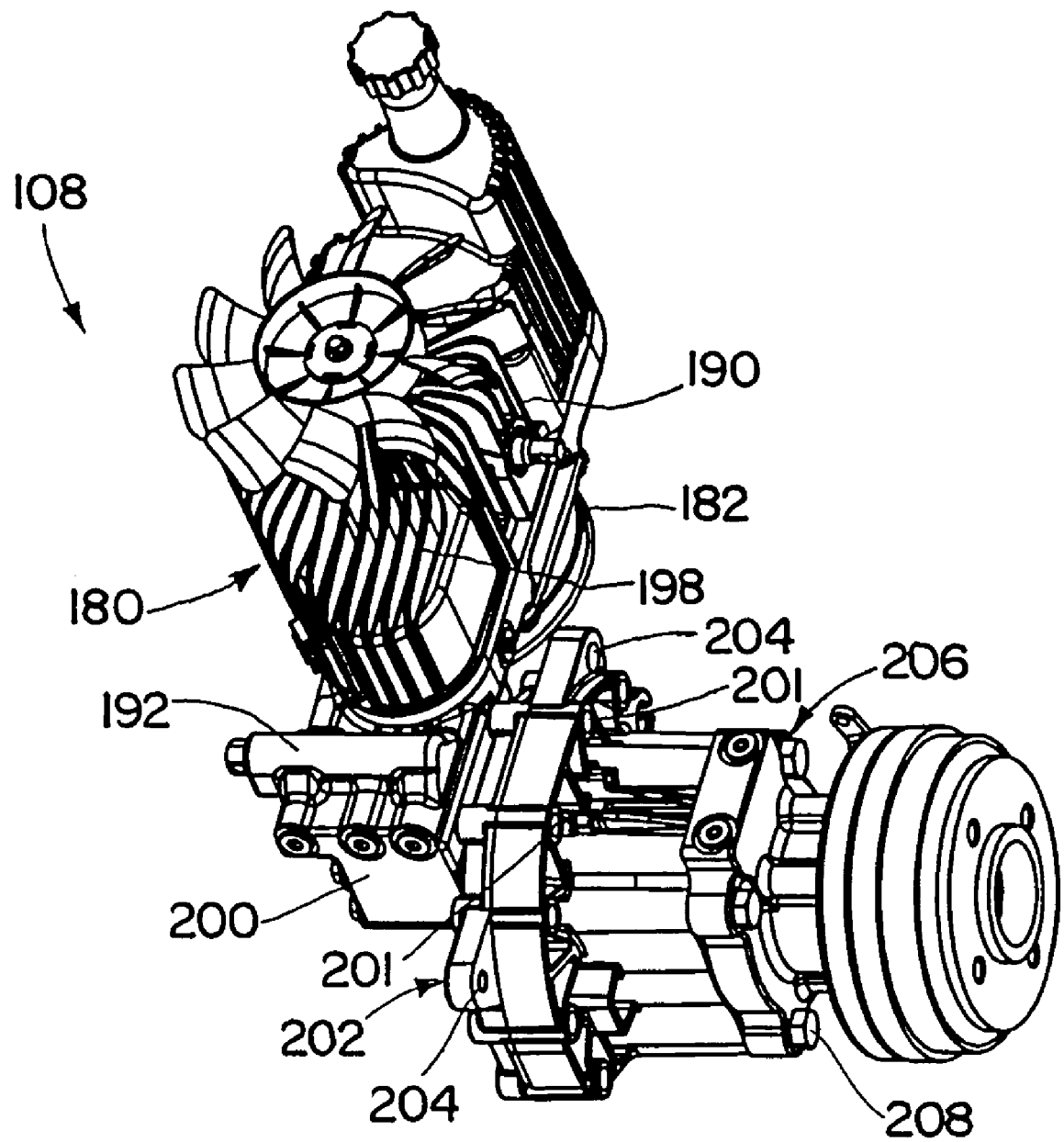
FIG. 14 is perspective view of another hydrostatic transmission in accordance with the invention.
Figure 15:
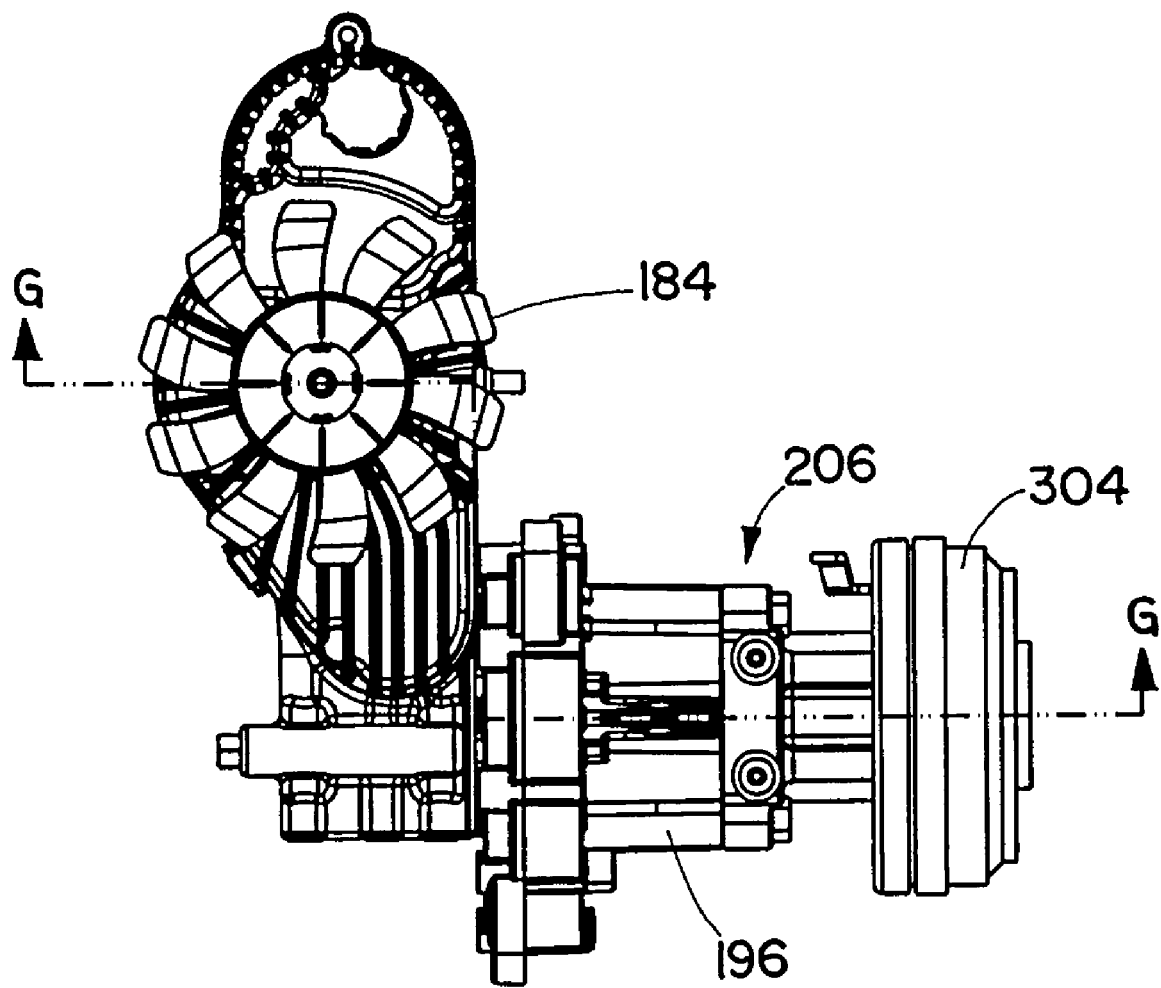
FIG. 15 is a plan view of the hydrostatic transmission of FIG. 14.
Figure 16:
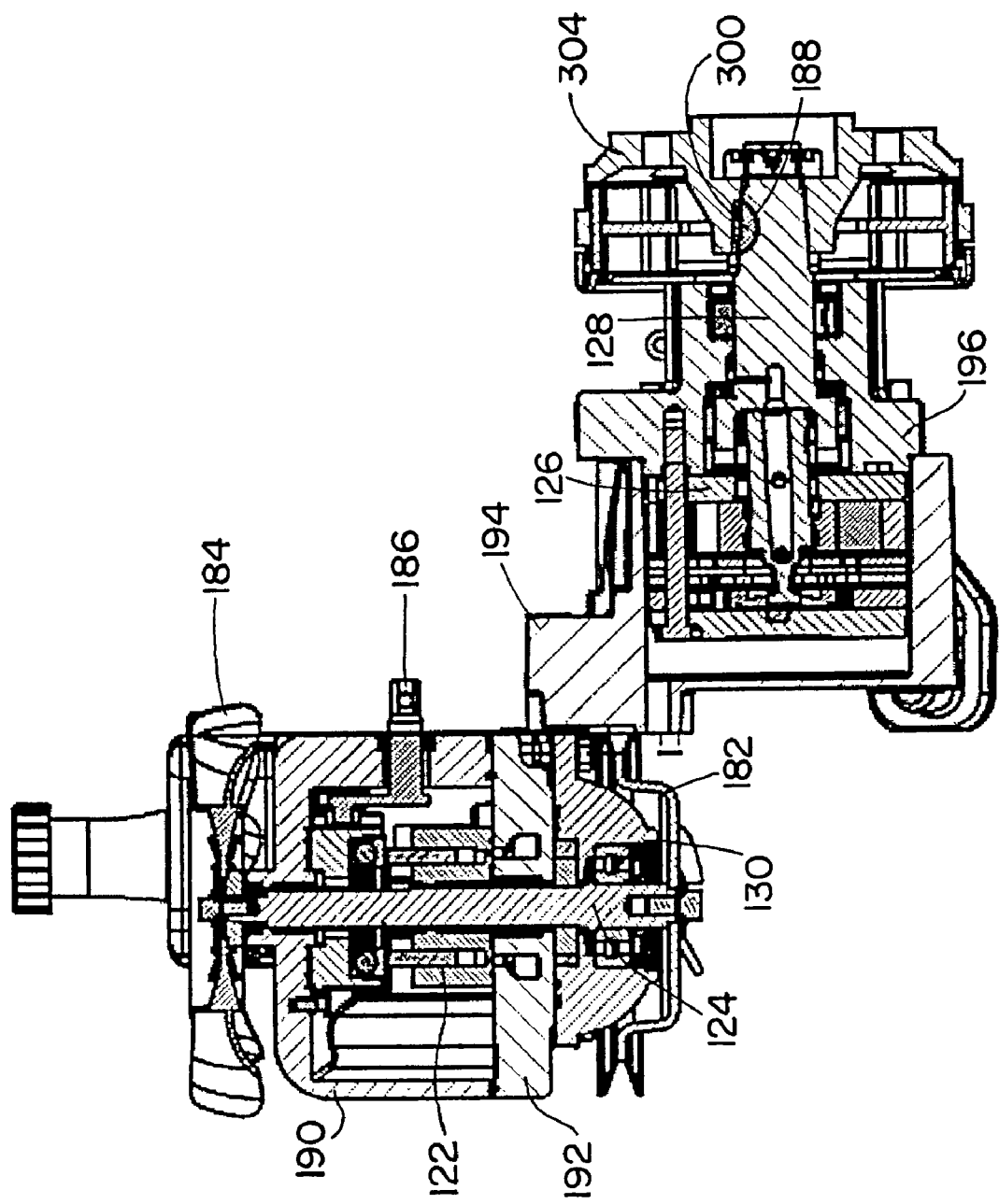
FIG. 16 is a cross-sectional view of the hydrostatic transmission FIG. 15 taken along the 16-16.

Turning now to FIGS. 14-20, and initially to FIGS. 14-16, another hydrostatic transmission in accordance with the invention is illustrated. The hydrostatic transmission 108 is similar to the hydrostatic transmission shown and described in connection with FIGS. 3-13 and includes an IHT housing 180. The pump input shaft 124 extends from opposing sides of the IHT housing 180. A pulley 182 is provided on the lower end of the shaft 124 for connection via a belt, or other suitable means, to a prime mover such as the internal combustion engine of the mower 10. A fan 184 is secured to the upper end of the pump shaft 124 and is configured to draw air across the hydrostatic transmission 108 for cooling purposes. A trunnion arm 186 extends from housing 180 and is configured to actuate a swash block to control the flow direction and flow rate of the pump element 122 in a conventional manner. The trunnion 186 can be connected to the controls 16 of the mower 10 directly or via a suitable linkage.

The motor output shaft 128 extends from the IHT housing 180 and is supported therein by one or more bearings. The motor output shaft 128 includes a key way 188 for receiving a key 300 for securing a hub 304 of a wheel directly to the output shaft 38 for rotation therewith.

The IHT housing 180 is generally formed by four components including an external pump housing 190, a pump end block 192, a nose cup 194, and a motor housing 196. The pump element 122 is mounted to the pump end block 192 and surrounded by the external pump housing 190, which is also secured to the end block 192. The external pump housing 190 includes a plurality of cooling fins 198 on its exterior surface for dissipating heat generated by the hydrostatic transmission 108.

In the illustrated embodiment, the pump end block 192 and external pump housing 190 together fully enclose the pump element 122. As will be described, the pump end block 192 has several passageways (e.g., supply and return lines) therein for the supply and return of the fluid between the pump element 121 and the motor element 122, etc. In this regard, the pump end block 192 has an extension 200 through which passageways extend. An external surface 202 of the extension 200 is exposed to the environment for dissipating heat generated during operation of the IHT 108. Further details of the end block 192 are set forth below.

The interior of the external pump housing 198 is typically filled with hydraulic fluid and serves as the sump 142. The oil filter 146 for filtering the fluid of the hydrostatic transmission 108 is mounted to the pump end block 192 and contained within the external pump housing 198. The oil filter 146, can be accessed from a side of the pump end block 192 thereby allowing easy replacement. The charge pump 130 is mounted to the end block 192 and draws fluid from the sump 142 via the filter 146.

The pump end block 192 and nose cup 194 are connected together with a pair of bolts 201 that extend through bores in the nose cup 194. The nose cup 194 includes passageways (supply line A or return line B shown in FIG. 5) for supplying and returning fluid between the pump element 122 and the motor element 126. The nose cup 194 includes a mounting surface 202 and bolt holes 204 for mounting the IHT 108 to the frame of a vehicle, for example.

The motor element 126 is supported within the motor housing 196. Together, the motor element 126 and motor housing 196 form a motor module 206 that is received within a tubular portion 208 of the nose cup 194 and secured thereto as a unit via bolts 208.

It will be appreciated that the motor module 206 in this embodiment is also designed to be easily installed as a unit (e.g., mounted to the nose cup 194) to form the IHT 108. Accordingly, motor modules 206 with different characteristics can be installed depending on a given application. For example, various motor modules 206 with motor elements 126 of different displacements can be provided, and a motor module 206 having a motor element 126 with desired displacement can then be selected and installed in the IHT 108. This allows flexibility in manufacturing by allowing an end user to select a motor module 206 having a desired displacement. Thus, a single IHT 108 can be configured to operate in a variety of vehicles and/or applications simply by installing a desired motor module 206. Further, should a motor element 126 require servicing or replacement, the motor module 206 can simply be removed from the IHT 108 to be repaired or replaced.

Turning now to FIGS. 17-20, the details of the end block 192 will be described. The end block 192 has a pump mount surface 220 having kidney ports 222 for supplying and returning fluid from the pump element 122. The kidney ports 222 connect via internal passageways (e.g., supply and return lines A and B) to supply and return ports 223 located on extension 200. Supply and return ports 223 connect to corresponding ports and passageways in the nose cup 194, which in turn communicate with the motor element 126 thereby forming a closed hydraulic loop including the pump element 122 and the motor element 126.

Check valves 134 and 138 are provide in the end block 192 between the charge pump 130 and supply and return lines A and B. The bypass valve 158 in this embodiment is a threaded member that is configured to open a bypass passageway (not shown) to thereby connect supply and return lines A and B.

Figure 17:
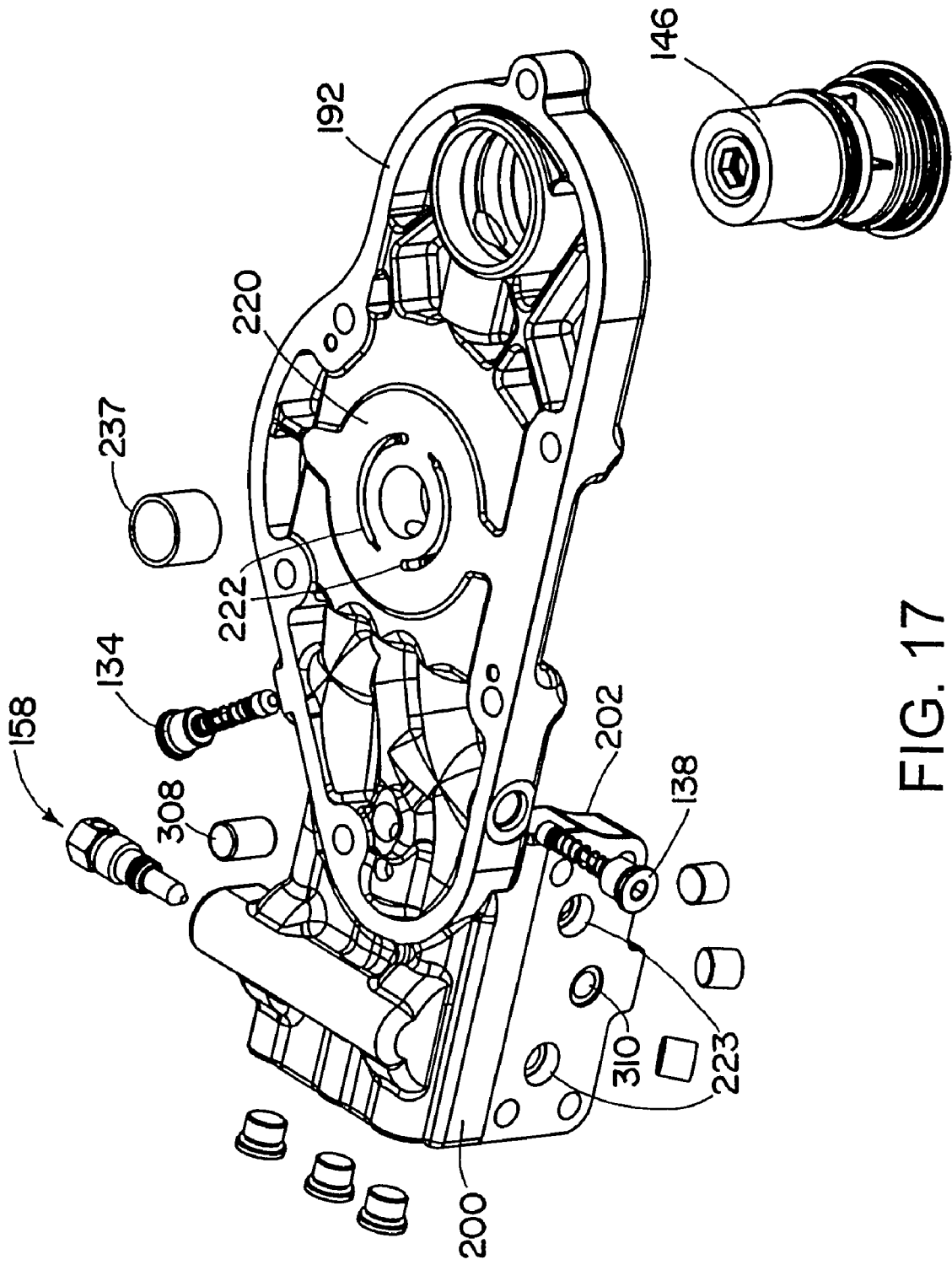
FIG. 17 is an assembly diagram of an end block of the transmission of FIG. 14.
Figure 18:
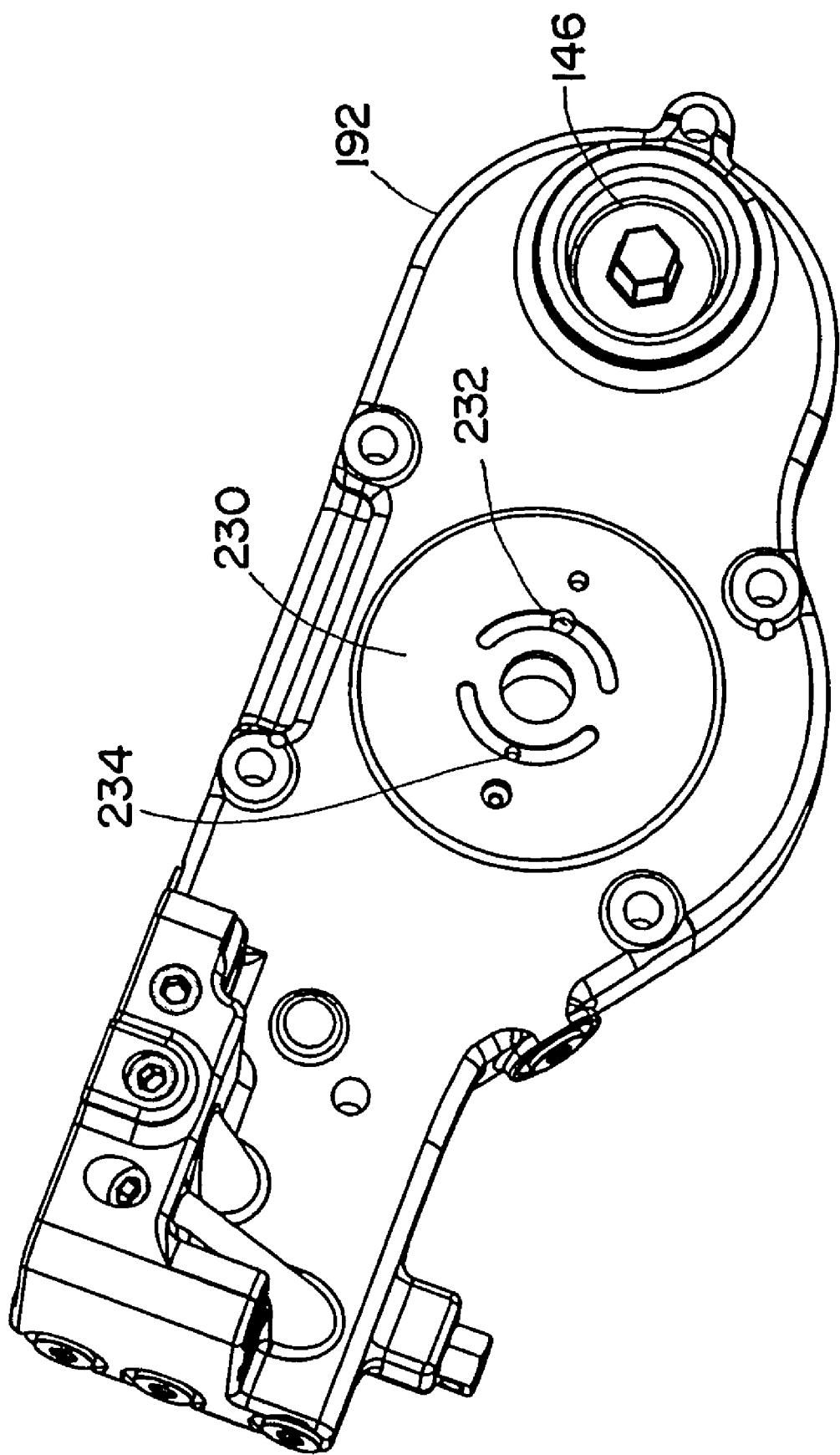
FIG. 18 is a perspective view of the underside of the end block.
Figure 19:
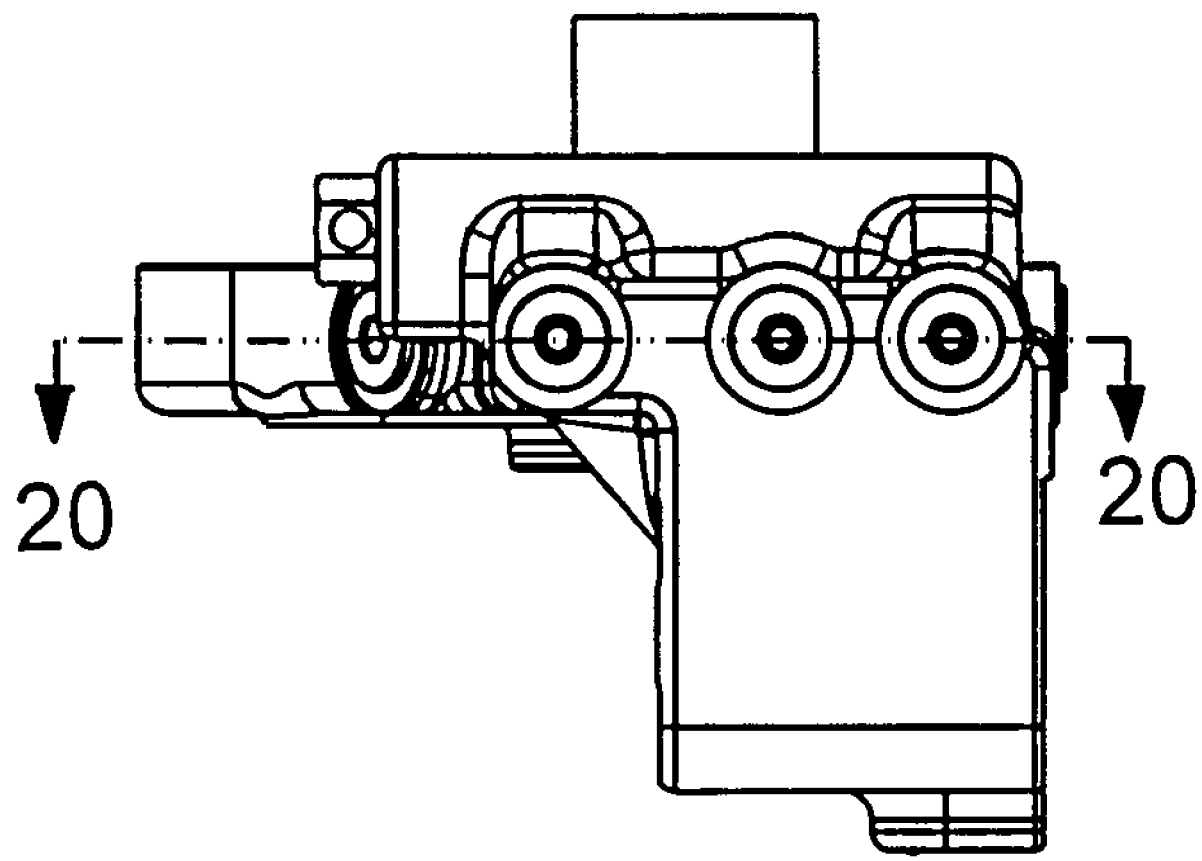
FIG. 19 is a side elevational view of the end block.
Figure 20:
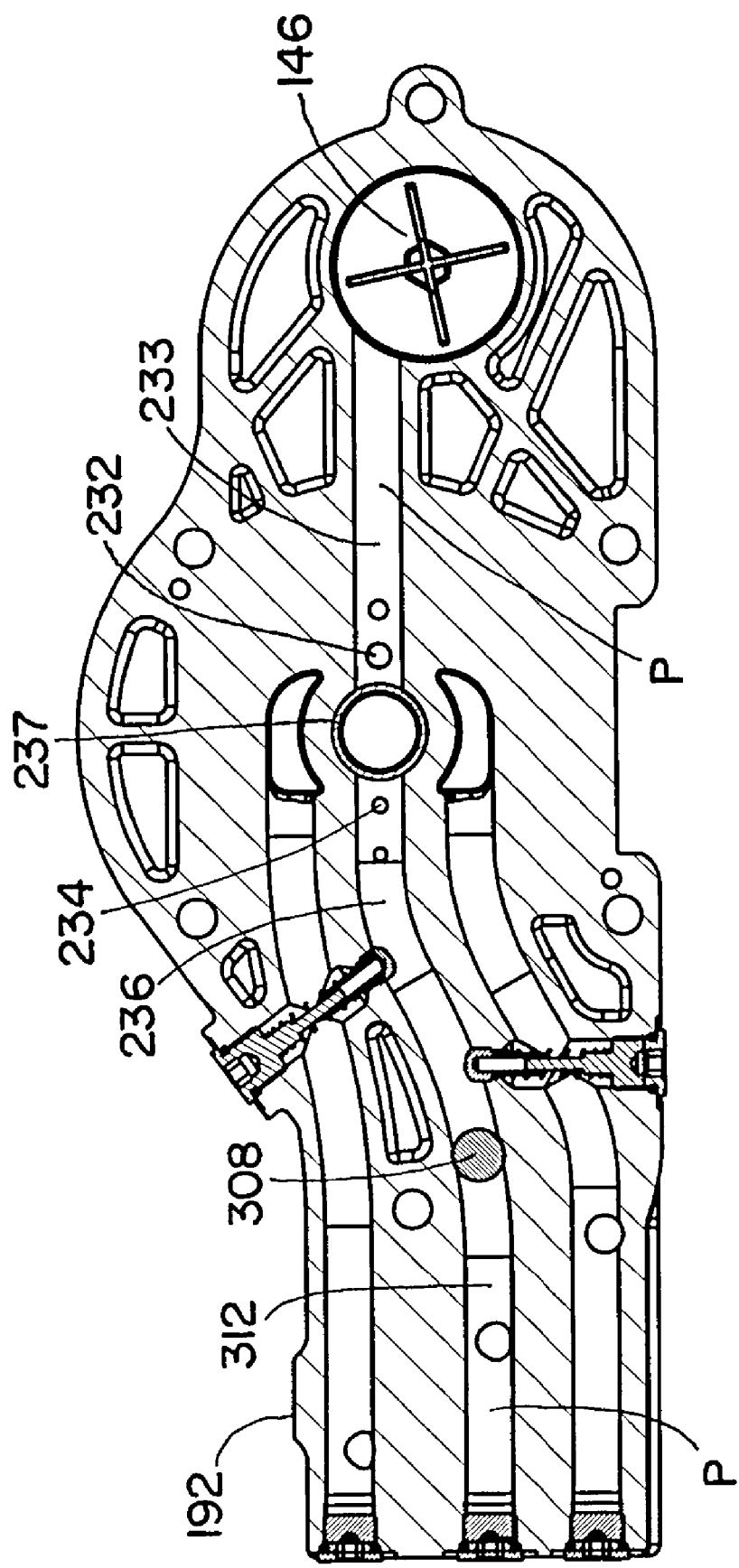
FIG. 20 is a cross-sectional view of the end block taken along the line 20-20 in FIG. 19.

In FIG. 17, the underside of the end block 192 is illustrated. The end block 192 includes a charge pump mount surface 230 to which the charge pump 130 mounts. Fluid is drawn by the charge pump 130 from the sump 142 via the filter 146 and charge pump intake line 233 through charge pump intake port 232. The charge pump 130 discharges via charge pump discharge port 234 to charge pump discharge line 236. Charge pump intake line 233 and charge pump discharge line 236 formed by a common passageway P that is separated by plug 237 (see FIG. 6). Plug 237 is cylindrical and hollow such that a rotatable shaft (e.g., the input shaft 124) can extend therethrough for driving the charge pump 130. Charge line 236 is connected to supply and return lines A and B via check valves 134 and 138 for supplying makeup flow thereto.

Another plug 308 is inserted into the passageway P thereby forming another portion thereof separate from the charge pump intake line 233 and charge pump discharge line 236. Thus, the passageway P is divided into three portions. A first portion is a motor case drain line 312 and is connected to the motor element 126 for draining fluid therefrom via drain port 310. A second portion, separated from the motor case drain line 312 by plug 308 and from the charge pump intake line 233 by plug 237, is the charge pump discharge line 236. A third portion is the charge pump intake line 233 which is separated from the charge pump discharge line 236 by plug 237. It will be appreciated that the charge pump intake line 233 and discharge line 236 are connected by the charge pump 130.

Accordingly, it will be appreciated that by dividing the single passageway P into three separate portions, manufacturing the end block is simplified as separate passageways need not be formed therein.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An integrated hydrostatic transmission comprising:
an end block having a pump mount surface;
a nose cup connected to the end block and having a motor mount surface;
a pump element mounted to the pump mount surface of the end block and surrounded by an external pump housing; and
a motor module including a housing portion and a motor element mounted to the motor mount surface of the nose cup, the motor element having an output shaft extending through the housing portion of the motor module to an exterior of the transmission for connection to a wheel;
wherein the end block and nose cup include supply and return passageways for connecting the pump element to the motor element in a closed loop;
wherein the end block has an exposed surface across which air can circulate to dissipate heat generated by the hydrostatic transmission; and
wherein the nose cup includes a tubular portion for receiving and at least partially enclosing the motor element, the nose cup and housing portion of the motor module together enclose the motor element when the motor module is mounted to the nose cup.

2. An integrated hydrostatic transmission as set forth in claim 1, wherein the nose cup includes a mounting surface for mounting to a frame of a vehicle.

3. An integrated hydrostatic transmission comprising:
an end block having a pump mount surface;
a nose cup connected to the end block and having a motor mount surface;
a pump element mounted to the pump mount surface of the end block and surrounded by an external pump housing; and
a motor module including a motor element mounted to the motor mount surface of the nose cup;
wherein the end block and nose cup include supply and return passageways for connecting the pump element to the motor element in a closed loop; and wherein the end block has an exposed surface across which air can circulate to dissipate heat generated by the hydrostatic transmission; and further comprising two intersecting passageways in the end block forming a chamber at their intersection, respective portions of the passageways extending from opposite sides of the chamber via openings bounded by a wall of the chamber;

a plug with a transversely extending passageway extending therethrough with openings bounded by a side surface of the plug;

wherein the plug is inserted into the chamber such that the transversely extending passageway is aligned with two of the respective portions of the passageways with the side surface of the plug sealing against the wall of the chamber bounding the openings of the respective portions of the passageways, and wherein the plug is spaced apart from the openings of the other two respective portions of the passageways to form a flow passageway through the chamber around the plug.

4. An integrated hydrostatic transmission as set forth in claim 1, further comprising a charge pump mounted to the end block and connected to the closed loop for supplying makeup flow thereto.

5. An integrated hydrostatic transmission as set forth in claim 1, wherein the end block includes a bypass valve for connecting the supply and return passageways.

6. An integrated hydrostatic transmission as set forth in claim 1, further comprising a filter mounted to the end block and surrounded by the pump housing.

7. An assembly for use in a hydrostatic transmission comprising:

a body including two intersecting passageways forming a chamber at their intersection, respective portions of the passageways extending from opposite sides of the chamber via openings bounded by a wall of the chamber;

a plug with a transversely extending passageway extending therethrough with openings bounded by a side surface of the plug;

wherein the plug is inserted into the chamber such that the transversely extending passageway is aligned with two of the respective portions of the passageways with the side surface of the plug sealing against the wall of the chamber bounding the openings of the respective portions of the passageways; and wherein the plug is spaced apart from the openings of the other two respective portions of the passageways to form a flow passage through the chamber around the plug.

8. An assembly for use in a hydrostatic transmission as set forth in claim 7, further comprising a bore extending through the chamber, and wherein the plug is generally cylindrical and configured to be received in the bore.

9. An assembly for use in a hydrostatic transmission as set forth in claim 8, wherein the bore and the plug have mating threads for securing the plug within the bore.

10. An assembly for use in a hydrostatic transmission as set forth in claim 7, wherein the intersecting passageways intersect at right angles.

11. A method of isolating flow between two intersecting passageways comprising:

inserting a plug into a chamber formed at the intersection of the two passageways, the plug defining a flow passageway between two respective portions of a first passageway while allowing flow through the chamber around the plug between two respective portions of a second passageway.

12. A method of dividing a passageway in an assembly for use in a hydrostatic transmission comprising:

inserting a plug in the passageway to divide the passageway into a motor case drain portion and a charge pump portion; and inserting a plug into the charge pump portion to divide the charge pump portion into a charge pump intake line portion and a charge pump discharge portion.

13. An assembly for use in a hydrostatic transmission comprising:

a body including a passageway formed therein;

a first plug dividing the passageway into a first portion and a second portion; and a second plug dividing the second portion into an intake line and a discharge line that can be connected by a pump element.

14. An assembly as set forth in claim 13, wherein the second plug has a hollow cylindrical shape configured to allow a rotatable shaft to pass therethrough.

15. An assembly as set forth in claim 13, wherein the first portion is a motor case drain line connectable to a motor case for draining fluid therefrom.

* * * * *